US008570193B2

(12) United States Patent
Joo et al.

(10) Patent No.: US 8,570,193 B2
(45) Date of Patent: Oct. 29, 2013

(54) APPARATUS AND METHOD FOR TRANSMITTING/IDENTIFYING LOCATION BASED ON LOCAL COMMUNICATION

(75) Inventors: In-One Joo, Daejon (KR); Sang-Uk Lee, Daejon (KR); Jae-Hoon Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 866 days.

(21) Appl. No.: 12/515,287

(22) PCT Filed: Nov. 7, 2007

(86) PCT No.: PCT/KR2007/005597
§ 371 (c)(1),
(2), (4) Date: May 18, 2009

(87) PCT Pub. No.: WO2008/060064
PCT Pub. Date: May 22, 2008

(65) Prior Publication Data
US 2010/0033343 A1    Feb. 11, 2010

(30) Foreign Application Priority Data
Nov. 17, 2006   (KR) .................. 10-2006-0114043
Oct. 18, 2007   (KR) .................. 10-2007-0105045

(51) Int. Cl.
*G08B 21/00* (2006.01)
(52) U.S. Cl.
USPC ...... 340/991; 340/990; 340/993; 340/995.12; 342/457
(58) Field of Classification Search
USPC .................... 340/988–993, 995; 342/457
See application file for complete search history.

(56) References Cited

U.S. PATENT DOCUMENTS

| 5,691,980 A | 11/1997 | Welles, II et al. |
| 7,277,028 B1 * | 10/2007 | Janke ........................... 340/905 |
| 2002/0067288 A1 * | 6/2002 | Wakamatsu et al. ........ 340/901 |
| 2004/0230370 A1 * | 11/2004 | Tzamaloukas ................ 701/200 |

(Continued)

FOREIGN PATENT DOCUMENTS

| JP | 2005-303669 A | 10/2005 |
| KR | 1020030067865 A | 8/2003 |

(Continued)

OTHER PUBLICATIONS

International Search Report of International Application No. PCT/KR2007/005597 filed on Nov. 7, 2007.

(Continued)

*Primary Examiner* — Mohammad Ghayour
*Assistant Examiner* — Mark Rushing
(74) *Attorney, Agent, or Firm* — Kile Park Reed & Houtteman PLLC

(57) ABSTRACT

Provided are an apparatus and method for transmitting/identifying a location based on local communication. The apparatus, includes: a location information calculating unit for receiving a Global Positioning System (GPS) signal from a GPS satellite and calculating location information; own location transmitting unit for transmitting a signal, in which the calculated location information and recognition information are inserted, through a local communication antenna; a counterpart location receiving unit for receiving a signal transmitted from another location transmitting/identifying apparatus located in a close range through the local communication antenna; and a counterpart location identifying unit for checking the received signal and identifying a location of another location transmitting/identifying apparatus.

8 Claims, 3 Drawing Sheets

(56) References Cited

U.S. PATENT DOCUMENTS

2005/0259002 A1* 11/2005 Erario et al. ............. 342/357.07
2006/0235967 A1* 10/2006 Fritz ............................. 709/224
2007/0016372 A1* 1/2007 Browne et al. ................ 701/213

FOREIGN PATENT DOCUMENTS

KR          10-0488177           4/2005
KR          1020060010961 A      2/2006
KR          1020060066630 A      6/2006
WO          2006/052102 A1       5/2006

OTHER PUBLICATIONS

Written Opinion of International Application No. PCT/KR2007/005597 filed on Nov. 7, 20076.

* cited by examiner

APPARATUS AND METHOD FOR TRANSMITTING/IDENTIFYING LOCATION BASED ON LOCAL COMMUNICATION

TECHNICAL FIELD

The present invention relates to an apparatus and method for transmitting/identifying a location based on local communication; and, more particularly, to an apparatus and method for transmitting/identifying a location of a close object based on local communication in real-time by receiving a channel for freely transmitting/receiving location information in a close range, transmitting own location information based on the channel, and directly receiving counterpart location information, and This work was supported by the IT R&D program for MIC/IITA [2006-S-021-01, "Feasibility Study of Regional Ground Station and Search and Rescue Service Technology for Korean GNSS"].

BACKGROUND ART

A navigation apparatus, which was used only by people of a class due to a high price, has been generalized and are loaded in most vehicles recently. Also, the navigation apparatus has been miniaturized and can be mounted in a mobile communication terminal.

Generally, a navigation technology provides a function for grasping own location in real-time through a Global Positioning System (GPS) and guiding a road to a destination.

Recently, there is an additional service for providing counterpart location information such as a road guide service in consideration of a traffic situation and a friend seeking service based on a communication channel used in a mobile communication terminal of mobile communication service companies.

However, since the additional service can be used only when an extra fee should be paid, only limited subscribers may use the additional service. Also, the additional service has not been applied to diverse application fields.

Referring to FIG. 1, a location information providing system of a conventional centrally controlled method will be described hereinafter.

When a GPS satellite 11 transmits a GPS signal, a navigation 12 receives the GPS signal through a GPS antenna and calculates a present location.

Subsequently, a mobile communication terminal 13 transmits the location information transmitted from the navigation 12 to a location information collecting and processing apparatus 14 through a base station.

The location information collecting and processing apparatus 14 acquires location information of each mobile communication terminal through the above procedure.

Therefore, when the mobile communication terminal 13 intends to acquire location information of another mobile communication terminal, the mobile communication terminal 13 accesses to the location information collecting and processing apparatus 14 and acquires location information of a targeted mobile communication terminal through authentication by the additional service subscriber.

DISCLOSURE

Technical Problem

An embodiment of the present invention is directed to solve a problem that a user should pay an extra fee and subscribe for the additional service since the location information providing system of the conventional centrally controlled method provides counterpart location information such as a road guide service and a friend seeking service in consideration of a traffic situation based on the location information collecting and processing apparatus operated by a mobile communication service company, and a problem that a time for acquiring desired location information of the counterpart increases and it is difficult to know an exact location in a mobile environment such as a vehicle since the location information providing system adopts the centrally controlled method for cooperating with the navigation module in the location information collecting and processing apparatus, collecting the location information of the mobile communication terminal, and providing the information to the user.

Another embodiment of the present invention is directed to providing an apparatus and method for transmitting/identifying a location of a close object based on local communication in real-time, which can be applied in diverse application fields such as preventing of traffic accident, providing of accompanying vehicle location information, preventing of vehicle theft, and preventing of child missing, by receiving a channel for freely transmitting/receiving location information in a close range, transmitting own location information based on the channel, and directly receiving counterpart location information.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an apparatus for transmitting/identifying a location of a close object based on local communication, the apparatus including: a location information calculating unit for receiving a Global Positioning System (GPS) signal from a GPS satellite and calculating location information; own location transmitting unit for transmitting a signal, in which the calculated location information and recognition information are inserted, through a local communication antenna; a counterpart location receiving unit for receiving a signal transmitted from another location transmitting/identifying apparatus located in a close range through the local communication antenna; and a counterpart location identifying unit for checking the received signal and identifying a location of another location transmitting/identifying apparatus.

In accordance with another aspect of the present invention, there is provided a method for transmitting/identifying a location of a close object based on local communication, including the steps of: a) receiving a Global Positioning System (GPS) signal from a GPS satellite and calculating location information; b) transmitting a signal, in which the calculated location information and recognition information are inserted, through a local communication antenna; c) receiving a signal transmitted from another location transmitting/identifying apparatus located in a close range through the local communication antenna; and d) checking the received signal and identifying a location of another location transmitting/identifying apparatus.

Also, since the present invention is applied in a close range by limiting a location information output signal within a predetermined value, a plurality of users can apply resources of a limited radio channel.

Avantageous Effects

The present invention can be applied in diverse application fields such as preventing of a traffic accident, providing of accompanying vehicle location information, preventing of vehicle theft, and preventing of child missing, by receiving a channel for freely transmitting/receiving location information in a close range, transmitting own location information based on the channel, directly receiving counterpart location information and identifying a location of a close object based on local communication in real-time.

Also, the present invention can be realized at a low cost by using a local communication.

When the present invention receives a channel for freely transmitting/receiving location information in a close range and transmits own location information based on the channel, orbit information and almanac information of a Global Positioning System (GPS) satellite are transmitted together. Accordingly, another location transmitting/identifying apparatus can easily acquire own location information.

BEST MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
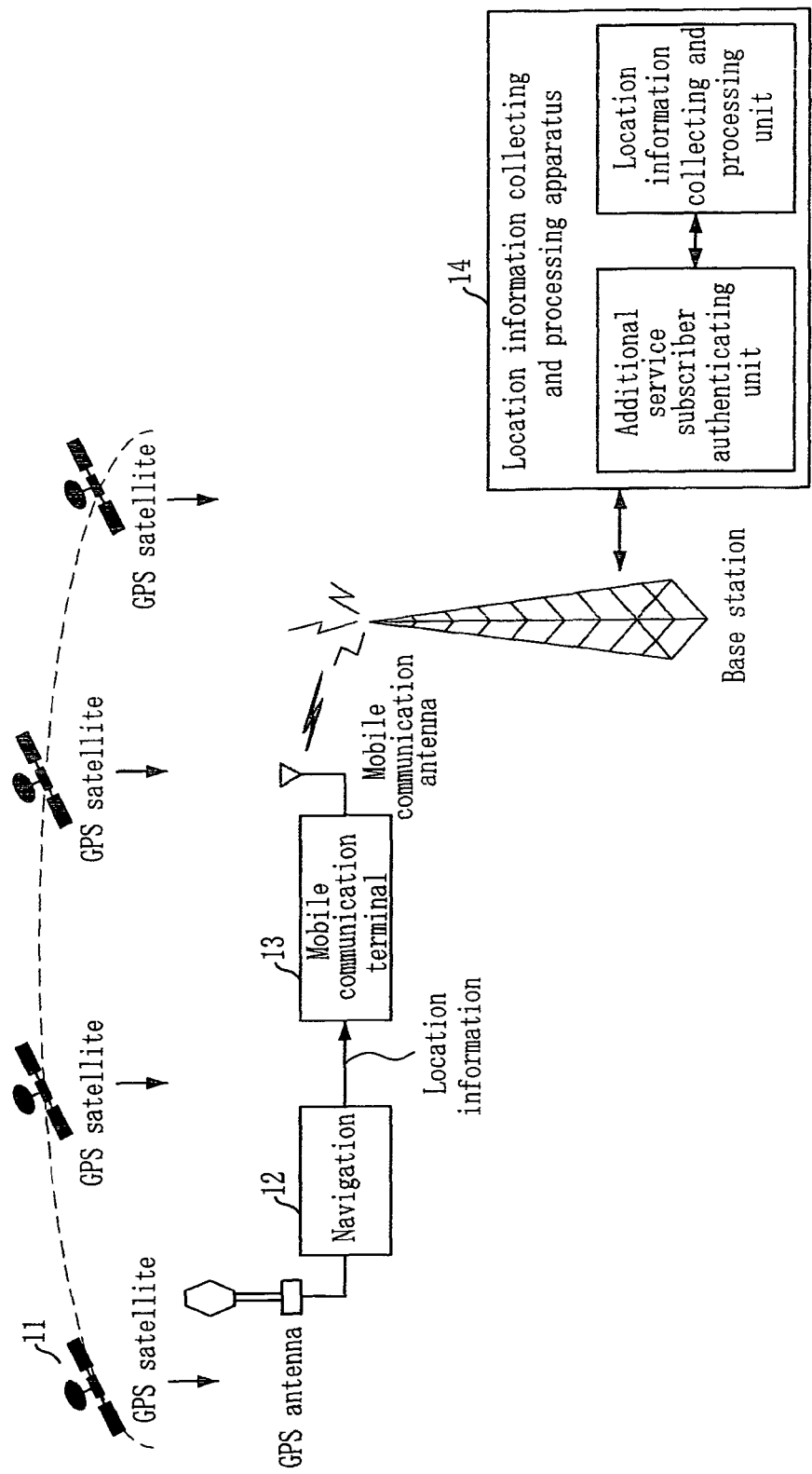
FIG. 1 shows a location information providing system of a conventional centrally controlled method.
Figure 2:
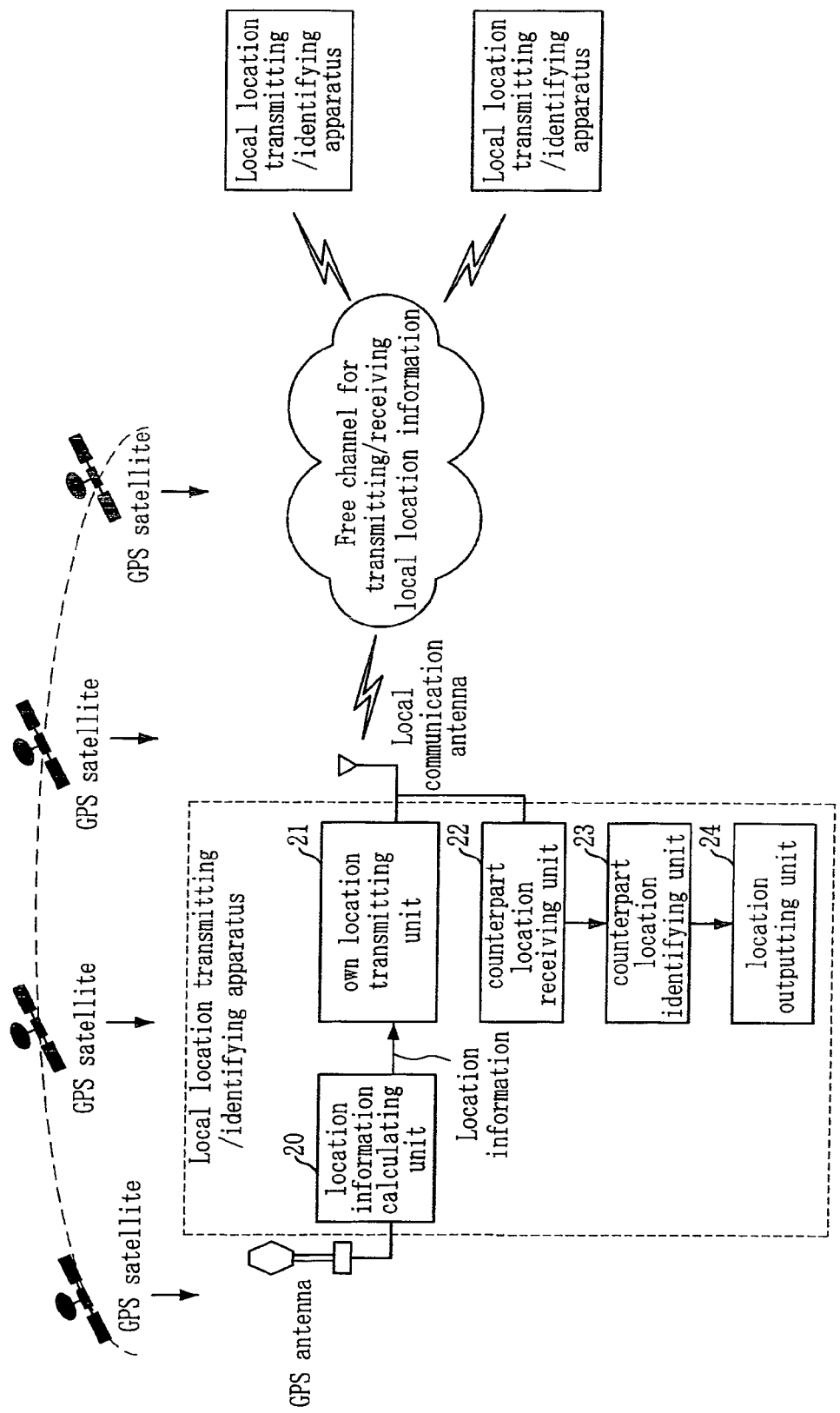
FIG. 2 shows an apparatus for transmitting/identifying a location based on local communication in accordance with an embodiment of the present invention.

FIG. 2 shows an apparatus for transmitting/identifying a location of a close object based on local communication in accordance with an embodiment of the present invention.

Referring to FIG. 2, the location transmitting/identifying apparatus according to the present invention includes a location information calculating unit 20, own location transmitting unit 21, a counterpart location receiving unit 22, a counterpart location identifying unit 23 and a location outputting unit 24.

The location information calculating unit 20 receives a Global Positioning System (GPS) signal from a GPS satellite and calculates location information. Own location transmitting unit 21 transmits a signal, in which location information calculated in the location information calculating unit 20 and recognition information for checking a source are inserted, through a local communication antenna. The counterpart location receiving unit 22 receives a signal transmitted from own location transmitting unit 21 of another location transmitting/identifying apparatus in a close range through the local communication antenna. The counterpart location identifying unit 23 checks the signal received in the counterpart location receiving unit 22 and identifies a location of the counterpart location transmitting/identifying apparatus. The location outputting unit 24 outputs the counterpart location identified in the counterpart location identifying unit 23 on a digital map.

It is also possible to transmit the counterpart location identified in the counterpart location identifying unit 23 to another apparatus, e.g., a vehicle controller, cooperating with the location transmitting/identifying apparatus instead of transmitting the counterpart location to the location outputting unit 24, and applies the counterpart location to a daily life, e.g., prevention of traffic accident.

Own location transmitting unit 21 transmits orbit information and almanac information of the GPS satellite detected to receive the GPS signal with the signal where own location information and recognition information are inserted, or transmits the orbit information and almanac information of the GPS satellite after inserting the orbit information and almanac information of the GPS satellite to the signal where own location information and recognition information are inserted. Own location transmitting unit 21 can also individually transmit the orbit information and almanac information of the GPS satellite through local communication antenna. Accordingly, another location transmitting/identifying apparatus can quickly receive the GPS signal. The above procedure will be described in detail hereinafter.

Generally, it is required to detect a GPS satellite transmitting a GPS signal that own location transmitting unit 21 can receive among 24 GPS satellites. Since each GPS satellite has unique code, the GPS satellite is detected by using the code. The detected location information of the GPS satellite is orbit information and almanac information. The GPS satellite can be quickly detected based on the orbit information and almanac information of the GPS satellite.

Additionally, the location transmitting/identifying apparatus further includes a storage for recording a name and a telephone number corresponding to the recognition information. The counterpart location identifying unit 23 can check a signal received in the counterpart location receiving unit 22 and output the location of the counterpart location transmitting/identifying apparatus and a name, a telephone number, and a vehicle registration number corresponding to the recognition information on a digital map through the location outputting unit 24.

The local communication channel is a free channel which does not charge an extra fee. That is, a free channel for transmitting/receiving local location information denotes an Industrial Scientific Medical (ISM) band, which is a frequency band internationally used in a most advanced field such as an industry, science and medical fields and does not charge an extra fee for frequency since the frequency is used in common. Also, the free channel denotes a band, which is allowed by government without charge for the purpose of transmitting/receiving local location information.

Hereinafter, application examples of the location transmitting/identifying apparatus according to the present invention will be described hereinafter.

For example, when the location transmitting/identifying apparatus is applied to a vehicle, a first local location transmitting/identifying apparatus located in a A vehicle acquires location information and recognition information from a plurality of local location transmitting/identifying apparatuses located in neighboring vehicles based on local communication and marks the location information and the recognition information on a digital map.

When the name, the telephone number or the vehicle registration number corresponding to the recognition information are location information transmitted from a non-recorded vehicle, only the location is marked.

The present invention is applied at night or at a time when a front view is not clear due to a bad weather caused by rainfall and thick fog. Accordingly, a driver can recognize a traffic situation around the driver and an accident is prevented.

Also, since the present invention is applied to a case that a plurality of accompanying vehicles are moving, the present invention can provide convenience to a driver by grasping location information of the accompanying vehicles. Also, since the driver can monitor own parked vehicle by receiving the location information of the parked vehicle, it is possible to immediately respond to a robbery or to prevent a missing child.

Figure 3:
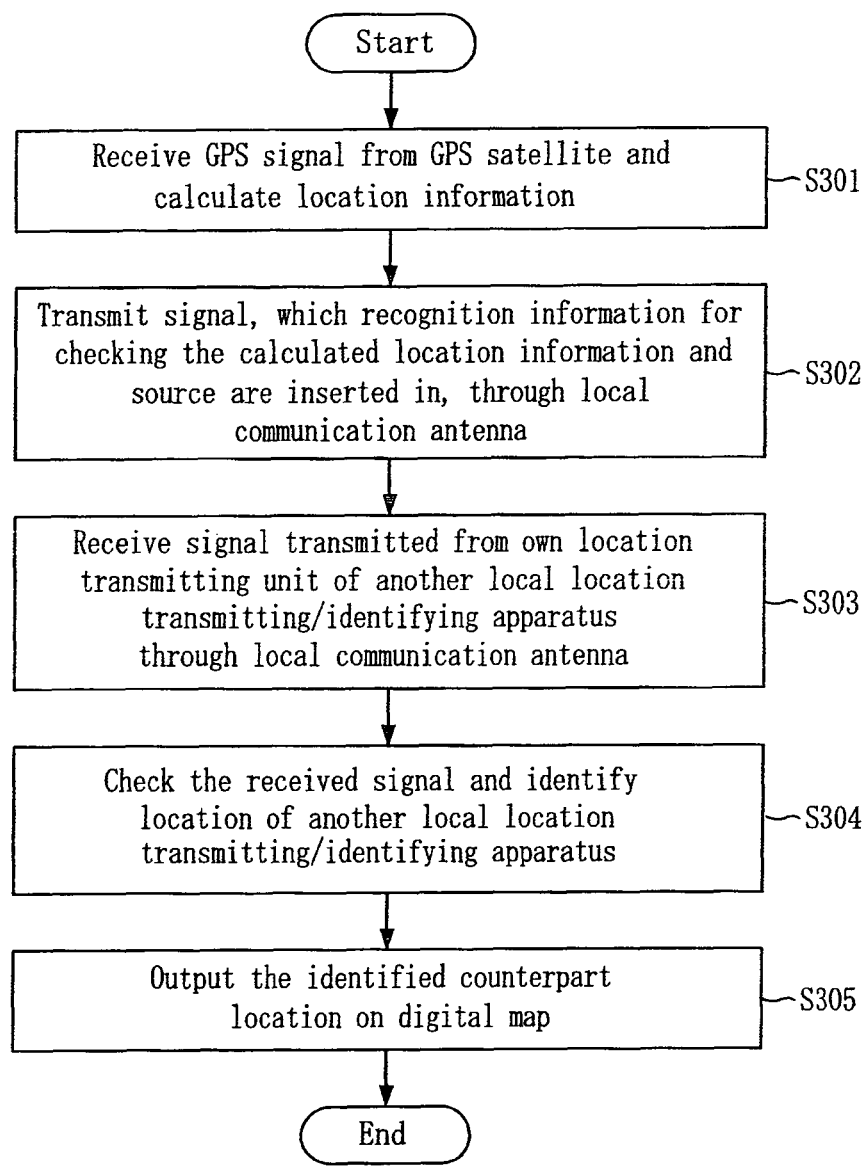
FIG. 3 is a flowchart describing a method for transmitting/identifying a location based on local communication in accordance with an embodiment of the present invention.

FIG. 3 is a flowchart describing a method for transmitting/identifying a location of a close object based on local communication in accordance with an embodiment of the present invention.

At step S301, location information is calculated by receiving a GPS signal from a GPS satellite.

At step S302, a signal, which recognition information for checking the calculated location information and a source are inserted in, is transmitted through a local communication antenna.

It is also possible to transmit the orbit information and almanac information of the GPS satellite detected to receive the GPS signal with the signal where own location information and recognition information are inserted, or transmits the orbit information and almanac information of the GPS satellite after inserting the orbit information and almanac information of the GPS satellite to the signal where own location information and recognition information are inserted. It is also possible to individually transmit the orbit information and almanac information of the GPS satellite through local communication antenna. Accordingly, another location transmitting/identifying apparatus can quickly receive the GPS signal. The above procedure will be described in detail hereinafter.

At step S303, a signal transmitted from own location transmitting unit of another location transmitting/identifying apparatus located in a close range is received through the local communication antenna.

At step S304, the received signal is checked and a location of another location transmitting/identifying apparatus is identified.

At step S305, the identified counterpart location is outputted on a digital map.

Additionally, it is possible to output the location of the counterpart location transmitting/identifying apparatus, and a name, a telephone number, and a vehicle registration number corresponding to the recognition information on a digital map based on the storage by checking the received signal.

Herein, it is preferred to periodically transmit the calculated location information through the local communication antenna.

It is preferred in the present invention that a radius of the local communication is within 3 km.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

The present application contains subject matter related to Korean Patent Application Nos. 2006-0114043 and 2007-0105045, filed in the Korean Intellectual Property Office on Nov. 17, 2006 and Oct. 18, 2007, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A first location apparatus for identifying a location of a close object based on local communication, comprising:
a location information calculating means for receiving a Global Positioning System (GPS) signal from a GPS satellite and calculating a location of the first location apparatus based on the GPS signal;
own location transmitting means for transmitting a first signal directly to a second location apparatus via an ISM frequency band, wherein the second location apparatus is located within about three kilometers from the first location apparatus during the transmitting, and wherein the first signal comprises the location of the first location apparatus and recognition information of the first location apparatus;
a counterpart location receiving means for receiving a second signal directly from the second location apparatus via the ISM frequency band; and
a counterpart location identifying means for identifying a location of the second location apparatus based on the second signal,
wherein the own location transmitting means transmits information corresponding to a location of the GPS satellite directly to the second location apparatus via the ISM frequency band, and wherein the second location apparatus uses the information corresponding to the location of the GPS satellite to receive a GPS signal from the GPS satellite.

2. The first location apparatus of claim 1, further comprising:
a location output means for outputting the location of the second location apparatus on a digital map.

3. The first location apparatus of claim 2, further comprising:
a storing means for storing a name, a telephone number, and a vehicle registration number corresponding to the recognition information of the first location apparatus,
wherein the counterpart location identifying means identifies a name, a telephone number, and a vehicle registration number corresponding to the second location apparatus based on the second signal, and
wherein the counterpart location identifying means outputs the location of the first location apparatus, the name, the telephone number, and the vehicle registration number corresponding to the second location apparatus, and the name, the telephone number, and the vehicle registration number corresponding to the first location apparatus on the digital map.

4. The first location apparatus of claim 1, wherein the information corresponding to the location of the GPS satellite comprises orbit information and almanac information of the GPS satellite.

5. A method for a first location apparatus to identify a location of a close object based on local communication, comprising the steps of:
   a) receiving a Global Positioning System (GPS) signal from a GPS satellite and calculating a location of the first location apparatus based on the GPS signal;
   b) transmitting a first signal directly to a second location apparatus via an ISM frequency band, wherein the second location apparatus is located within about three kilometers from the first location apparatus during the transmitting, and wherein the first signal comprises the location of the first location apparatus and recognition information of the first location apparatus;
   c) receiving a second signal directly from the second location apparatus via the ISM frequency band; and
   d) identifying a location of the second location apparatus based on the second signal,
   wherein the transmitting further comprises transmitting information corresponding to a location of the GPS satellite directly to the second location apparatus via the ISM frequency band, and wherein the second location apparatus uses the information corresponding to the location of the GPS satellite to receive a GPS signal from the GPS satellite.

6. The method of claim 5, further comprising the step of:
   e) outputting the location of the second location apparatus on a digital map.

7. The method of claim 6, further comprising the step of:
   f) storing a name, a telephone number, and a vehicle registration number corresponding to the recognition information of the first location apparatus in a storing means,
   wherein the identifying comprises identifying a name, a telephone number, and a vehicle registration number corresponding to the second location apparatus based on the second signal, and
   wherein the outputting comprises outputting the location of the first location apparatus, the name, the telephone number, and the vehicle registration number corresponding to the second location apparatus, and the name, the telephone number, and the vehicle registration number corresponding to the first location apparatus on the map.

8. The method of claim 5, wherein the information corresponding to the location of the GPS satellite comprises orbit information and almanac information of the GPS satellite.

* * * * *